United States Patent Office 3,369,890
Patented Feb. 20, 1968

3,369,890
METHOD FOR MAKING NIOBIUM-URANIUM ALLOY WITH PREDETERMINED TOTAL VOID VOLUME AND VOID SIZE
Harley A. Wilhelm and James K. McClusky, Ames, Iowa, assignors to the United States of America as represented by the United States Atomic Energy Commission
No Drawing. Filed Feb. 24, 1967, Ser. No. 619,130
6 Claims. (Cl. 75—122.5)

ABSTRACT OF THE DISCLOSURE

A method of producing a niobium-uranium alloy with predetermined void size and total void volume by mixing a uranium oxide, a niobium oxide and carbon with various carbon to oxygen ratios and heating the mixture to a temperature below the melting point of the resulting alloy.

*Contractual origin of the invention*

The invention described herein was made in the course of, or under, a contract with the United States Atomic Energy Commission.

*Background of the invention*

This invention relates to a niobium-uranium alloy and more particularly to a method of producing a niobium-uranium alloy having predetermined void size and total void volume.

Niobium with a melting point above 2400° C. and a comparatively low neutron cross section is an attractive metal for use in a nuclear fuel. Of course, niobium must be combined with a fissionable material in order to be useful as a fuel, and one such combination is a niobium-uranium alloy.

Several problems exist in the preparation of a useful niobium-uranium fuel. There is a liquidus-solidus composition gap for the 20 weight percent uranium alloy. On solidification, then, segregation of the uranium develops (since the liquid phase is always richer in uranium than the separating solid phase). Since a niobium-uranium alloy without uniform distribution would not burn evenly, a nonhomogeneous niobium-uranium alloy is not a useful nuclear fuel.

A nuclear fuel material must be able to be produced in various physical configurations because in some instances density is important while in others porosity may be paramount. Since core size is an important factor in reactor economics, a dense or substantially void-free material may be desired. Heretofore, a void-free niobium-uranium alloy has not been available.

The production of fission products during irradiation has long been a problem in the nuclear industry. Increased pressure within the fuel element caused by fission product production may cause the fuel or cladding to fail. A fuel matrix containing void spaces may be desirable for containing fission products produced during irradiation but the total void volume and the void size would have to be controlled, because a fuel with unevenly distributed void spaces would not burn uniformly and voids too large in size could cause structure failure.

From the above discussion it is obvious that for some instances void-free fuel is important and in some situations fuels containing substantially uniform-sized voids, uniformly distributed throughout the fuel body are important, and for all fuel applications a uniform distribution of fissionable material is necessary. Heretofore, a method has not been available by which niobium-uranium alloys without void spaces as well as with well distributed substantially uniform-sized void spaces may be produced.

*Summary of the invention*

This invention comprises a method of making homogeneous niobium-uranium alloys with predetermined void sizes and total void volume by varying the carbon to oxygen ratio of a mixture of niobium oxide, uranium oxide and carbon and sintering the mixture under vacuum to a temperature below the melting point of the resulting alloy.

*Description of the preferred embodiments*

Reference to a few of the experiments conducted may be helpful in understanding the scope of this invention. In all of the following experiments the oxides were mixed in a ball mill with carbon in the form of graphite and pressed into right circular tubes having an outside diameter of about 12 mm. and an inside diameter of about 4 mm. All samples were placed in crucibles inside an induction furnace for heating, and as the sample was heated and a vacuum applied to the furnace, the sample temperature was recorded as well as the pressure within the furnace and the amount of gas evolved. After each run was terminated and the sample cooled, several sections perpendicular to the tube's major axis were taken and examined with standard metallographic techniques for porosity.

In the following experiments, $Nb_2O_5$ and $UO_{2.14}$ were used as the oxides. The $Nb_2O_5$ had a tendency to "clump" and sufficient ball milling was used to produce a homogeneous starting mixture. While any niobium-uranium alloy might have been used in the experiments, the eutectic that occurs at about 20 weight percent uranium was preferred. The following equation represents the stoichiometric molar quantities necessary to produce the above-mentioned eutectic.

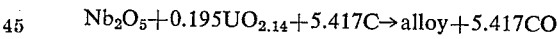
$Nb_2O_5 + 0.195UO_{2.14} + 5.417C \rightarrow alloy + 5.417CO$

Because molar quantities would have been unwieldly, the end product for the experiments was a 25-gram sample of the niobium-20 weight percent uranium alloy. The stoichiometric gram quantities of starting materials necessary to produce 25 grams of the eutectic alloy are as follows:

28.57 grams $Nb_2O_5$, 5.72 grams $UO_{2.14}$ and 7.01 grams C

The stoichiometric gram quantities were mixed, pressed, put into a tantalum crucible and heated to between 1950° C. and about 2100° C. Since the sintering was conducted below the melting point of the alloy, no segregation occurred, and the resulting product was a homogeneous niobium-20 weight percent uranium alloy containing many voids distributed throughout the sample. Experiments using 6.91, 6.81, 6.71, 6.61 and 6.51 grams of carbon were performed as well as experiments using greater than stoichometric amounts of carbon. Sample data are set out below.

Sample: 6.71 grams carbon, 28.57 grams $Nb_2O_5$, 5.72 grams $UO_{2.14}$

| Time | Sample Temp., °C. | Pressure, mm. |
| --- | --- | --- |
| 0825 | 0 | $6 \times 10^{-5}$ |
| 0840 | 1,050 | 800 |
| 0850 | 1,400 | 1,000 |
| 0857 | 1,520 | 800 |
| 0903 | 1,560 | 800 |
| 0908 | 1,650 | 800 |
| 0913 | 1,700 | 300μ |
| 0918 | 1,735 | 200μ |
| 0919 | 1,760 | 200μ |

| Time | Sample Temp., °C. | Pressure, mm. |
| --- | --- | --- |
| 0926 | 1,895 | 10μ |
| 0938 | 2,005 | 10μ |
| 0942 | 1,960 | 9μ |
| 1000 | 1,930 | 9μ |
| 1007 | 1,930 | ------- |
| 1038 | 1,930 | ------- |
| 1515 | 1,930 | ------- |
| 1600 | 1,930 | ------- |
| 1700 | 1,930 | ------- |
| 1715 | 1,930 | $5 \times 10^{-5}$ |

The 6.71 grams of carbon used in this run converts to a ratio of 5.19 moles of carbon per mole of $Nb_2O_5$. The alloy produced with this combination of reactants was slightly denser, more void-free, than the alloy produced with 6.81 grams of carbon. The alloy produced with 6.81 grams of carbon, that is, a molar ratio of 5.26 moles of carbon per mole of $Nb_2O_5$ was almost void-free.

Sample: 6.61 grams carbon, 28.57 grams $Nb_2O_5$, 5.72 grams $UO_{2.14}$

| Time | Sample Temp., °C. | Pressure, mm. |
| --- | --- | --- |
| 0912 | 0 | $7 \times 10^{-5}$ |
| 0937 | 1,605 | 800μ |
| 0950 | 1,710 | 100μ |
| 1015 | 1,940 | 10μ |
| 1030 | 1,990 | 10μ |
| 1407 | 1,900 | 10μ |
| 1525 | 1,905 | 10μ |
| 1655 | 1,910 | 10μ |
| 1713 | 1,920 | ------- |

These reactants, which represent a ratio of 5.11 moles of carbon per mole of $Nb_2O_5$, produced an alloy with voids. Alloys produced with 6.51 grams and lesser amounts of carbon showed increasing total void volume but decreasing porosity size.

From all the data it was determined that up to a certain point decreasing the carbon content from the stoichiometric value or increasing the oxygen content, that is, altering the carbon to oxygen ratio from the stoichiometric value, would reduce the number and size of voids in the sample. The ratio of about 5.20 moles carbon per mole of niobium and 0.209 mole oxygen or 0.217 mole of oxygen per mole of niobium and 5.417 moles carbon was found to produce the densest niobium-uranium alloy, one which was substantially void-free. As the carbon content was dropped below about 5.20 moles carbon per mole of niobium oxide or the oxygen content raised, the total void volume increased and the void size decreased. When the carbon content was increased from about 5.20 moles carbon per mole of niobium oxide or the oxygen content was lowered, the total void volume increased but the void size also increased. These results show that not only is it possible to control the total void volume but also the character of the voids, that is, the void size.

These process controls enable the production of many different end products.

Samples were prepared in which the particle size of the oxides and the carbon was varied. While changes in the oxide particle size had little or no effect on the number and size of the voids in the product alloy, variations in the graphite particle size did. Samples prepared from finer particles of graphite had fewer voids than samples prepared with larger particles.

Various crucible materials were used and, surprisingly, each crucible produced different results. Niobium and tantalum crucibles, for the same carbon or oxygen to niobium oxide ratio in the sample, produced denser alloys than did $ZrO_2$, $Y_2O_3$, TaC and graphite crucibles. By varying the graphite or oxygen content of the starting material, a particular product can be produced regardess of the crucible material, but each crucible material has its individual characteristics. Since the alloys prepared in these different crucibles had different lustres, analyses were performed to determine if crucible materials were deposited on the alloy surface during the reduction of the oxides to the metal. It was found that the inside and outside surfaces of the samples were dense metallic cases about 0.5 to 1 mm. in thickness surrounding areas with well distributed voids. Also, on the outside of the dense cases substantial amounts of the crucible materials were found, usually to a depth of about 1 micron. While it is not exactly understood why different crucible materials should affect the porosity of the alloy, perhaps pick-up by the alloy of some crucible material accounts for the variations.

The samples were heated at or about maximum temperatures for different lengths of time. It was found that increasing the heating times decreased the void formation for all crucibles, but the decrease in the metal crucibles was more substantial than in the ceramic or graphite crucibles.

It should be understood that the experiments reported herein are intended to be illustrative only. The definition and scope of this invention is to be found in the appended claims.

The embodiments of the invention in which an exclusive property or privilege is claimed are defined as follows:

1. A method of producing a niobium-uranium alloy comprising mixing a niobium oxide and a uranium oxide with carbon to form a homogeneous reactant mixture and sintering the mixture under vacuum at a temperature below the melting point of the niobium-uranium alloy to form said niobium-uranium alloy wherein a reactant mixture containing a greater than stoichiometric or a lower than stoichiometric carbon to oxygen ratio is used to obtain a predetermined total void volume and void size in the alloy.

2. The method of claim 1 wherein the niobium-uranium alloy contains about 20 weight percent uranium and the maximum sintering temperature is between about 1800° C. and about 2100° C.

3. A method according to claim 2 wherein the niobium oxide is $Nb_2O_5$, the uranium oxide has an oxygen atom to uranium atom ratio of about 2:1 and the carbon is in the form of graphite.

4. A method according to claim 3 wherein the uranium oxide is $UO_{2.14}$ and the reactant mixture contains between about 5.2 and about 5.4 moles of carbon to 1 mole of $Nb_2O_5$ whereby a lower total void volume than that prepared by reacting stoichiometric quantities is prepared.

5. The method of claim 4 wherein the reactant mixture contains 1 mole $Nb_2O_5$ to about 5.20 moles carbon to 0.195 mole $UO_{2.14}$, whereby a substantially void-free alloy is obtained.

6. A method according to claim 3 wherein the reactant mixture contains less than about 5.2 moles of carbon to 1 mole of $Nb_2O_5$ whereby the total void volume is increased but the void size is decreased.

(References on following page)

References Cited

UNITED STATES PATENTS 2,914,433  11/1959  McGeary et al. ____ 75—122.7 X
3,301,667  1/1967  Golliber et al. _____ 75—122.7

FOREIGN PATENTS 790,991  2/1958  Great Britain.

CARL D. QUARFORTH, *Primary Examiner.*
M. J. SCOLNICK, *Assistant Examiner.*